United States Patent [19]

Baresh et al.

[11] 4,240,206
[45] Dec. 23, 1980

[54] OVALITY MEASURING DEVICE AND METHOD

[75] Inventors: Joseph M. Baresh; Robert E. Nash, both of Seattle, Wash.

[73] Assignee: The Boeing Company, Seattle, Wash.

[21] Appl. No.: 611

[22] Filed: Jan. 3, 1979

[51] Int. Cl.³ .............................................. G01B 5/20
[52] U.S. Cl. .............................. 33/174 Q; 33/143 L; 33/174 L; 33/178 E
[58] Field of Search .......... 33/174 Q, 174 P, 174 PA, 33/174 PB, 178 E, 147 H, 147 F, 147 N, 148 H, 147 L, 143 L, 149 J, 178 D, 178 R, 174 L

[56] References Cited

U.S. PATENT DOCUMENTS

| | | | |
|---|---|---|---|
| 2,579,569 | 12/1951 | Hauch et al. | 33/147 N |
| 3,303,572 | 2/1967 | Vreeland, Jr. | 33/178 E |
| 3,750,294 | 8/1973 | Belke et al. | 33/147 L |
| 3,875,667 | 4/1975 | Wilke | 33/174 Q |

*Primary Examiner*—Willis Little
*Attorney, Agent, or Firm*—Morris A. Case; Bernard A. Donahue

[57] ABSTRACT

An anvil in conjunction with an electromechanical probe measures across a tube while a second anvil and electromechanical probe measure across the tube at right angles to the first anvil and probe. Signals from each of the probes are summed and displayed to show the ovality of the tubing. The anvils and probes are mounted to a head that is rotated open to permit placement over tubing and resiliently rotated closed to bring the probes in contact with the tubing.

17 Claims, 6 Drawing Figures

OVALITY MEASURING DEVICE AND METHOD

BACKGROUND OF THE INVENTION

When high pressure hydraulic lines are bent to shape as is normally required for installation, the bent portion of the line takes on an oval shape. This ovality is indicated by the difference between major and minor diameters of the lines. Excessive ovality indicates a weakening of the line that calls for rejection. One method of determining ovality of bent tubing is to use caliper type go-no-go gauges on the major and then on the minor diameters; which is time consuming, and requires rechecking.

U.S. Pat. No. 3,303,572 to T. Vreeland, Jr. shows a diameter gauge, for placement over the end of a member to be measured, with a pair of radially movable probes at 90 degrees from each other. A spring extends 270 degrees around the gauge with ends of the spring fastened to the probes. As the probes move it sets up a strain in the spring; which is sensed by a pair of strain gauge elements located on the spring to determine the average diametrical measurements.

U.S. Pat. No. 2,677,125 to Pistoles shows a snap type gauge for measuring across a diameter and indicating tolerance limits by use of lights.

SUMMARY OF THE INVENTION

A pair of electromechanical probes are located in a head at 90 degrees from each other. The probes are radially movable, and each acts in conjunction with an oppositely located anvil to measure the diameter. A head to which the probes and anvils are fastened is made in two parts pivotally and resiliently joined together to permit opening for placement over a bent tube. The probes measure the maximum and the minimum diameters; which are summed and displayed to continously show ovality.

It is an object of this invention to provide an instrument for instantaneously displaying the ovality of a bent tube.

It is yet another object of this invention to provide an instrument for readily indicating when ovality of a bent tube is out of a predetermined tolerance.

DETAILED DESCRIPTION

Figure 2:
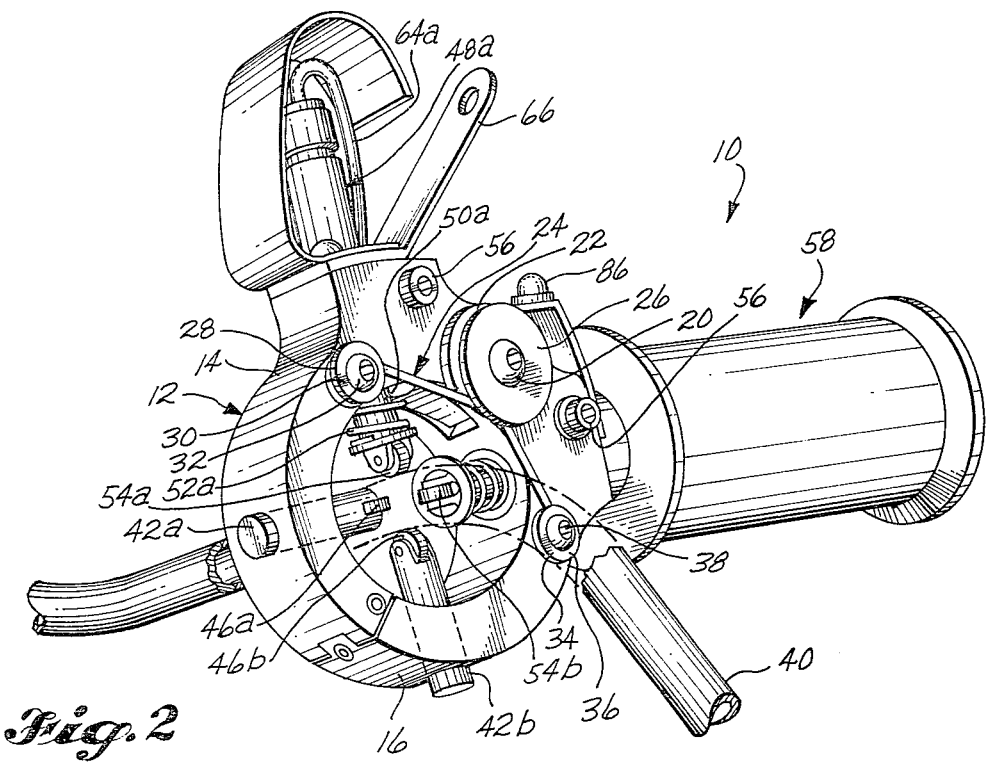
FIG. 2 shows a perspective view of the probe unit part of the measuring instrument.
Figure 3:
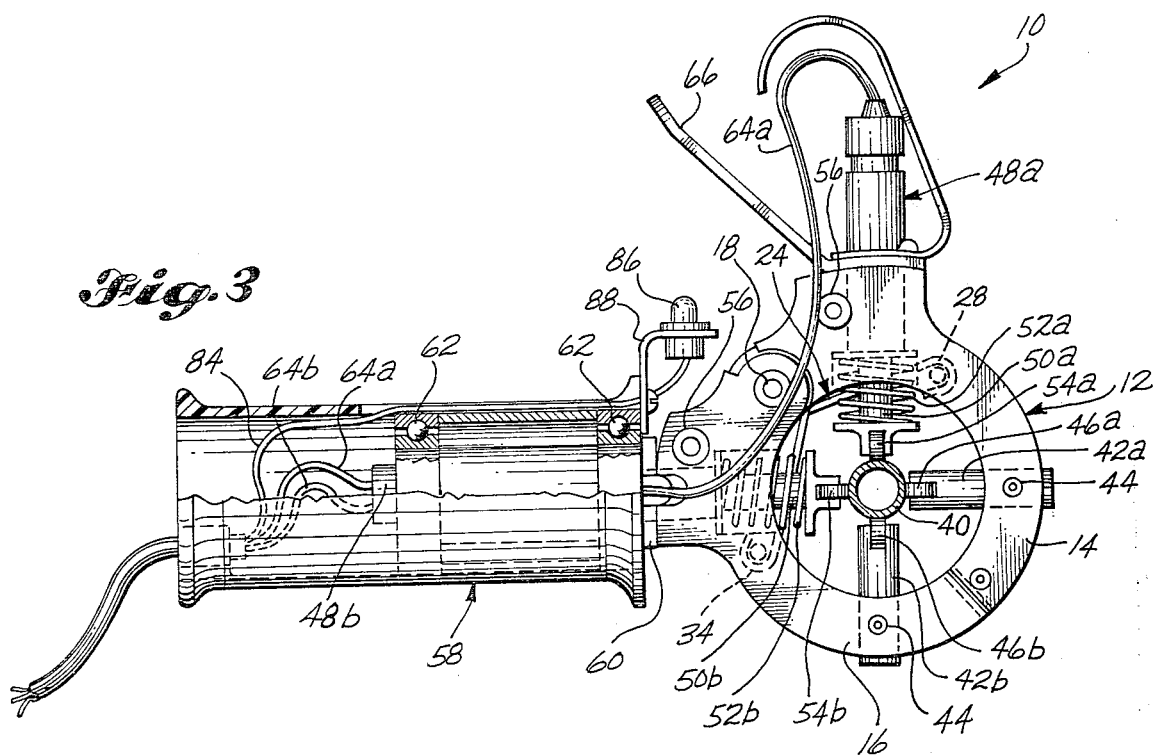
FIG. 3 shows a side elevational view partially in section of the probe unit of FIG. 2.

A hand held probe unit 10, as is best shown in FIGS. 2 and 3, has a head 12 made up of two parts 14 and 16. These two parts are pivotally joined together with pin 18. One end of the pin is threaded to accept bolt 20. The pin passes through a looped portion 22 of a spring 24; which is held in place with washer 26 and bolt 20. One end of the spring is turned back to form a loop 28 for joining to part 14 of the head by washer 30 and bolt 32; while the other end of the spring has a loop 34 for joining to part 16 by washer 36 and bolt 38. This spring serves to resiliently hold the two parts of the head 12 together while permitting the two parts of the head to rotate with respect to each other to permit locating the probe unit to encircle tubing 40. A pair of anvils 42a and 42b are radially mounted to the head at 90 degrees from each other, and are adjustably fastened thereto with set screws 44. A roller 46a is attached to the inwardly directed end of anvil 42a, and a roller 46b is similarly attached to the end of anvil 42b. A pair of electromechanical probes 48a and 48b are radially mounted to the head in the same radial plane as the anvils, and with probe 48b on the same axis as anvil 42a, and probe 48a on the same axis as anvil 42b; which permits diametrically measuring across the tubing in two different directions. The probes have reciprocally mounted rods 50a and 50b that are resiliently urged inward with springs 52a and 52b. The rod 50a has a roller 54a mounted on the end, and rod 50b has a roller 54b mounted on the end. The electromechanical probes are adjustably fastened with screws 56. In this invention the electromechanical probes are of the linear variable differential transformer (LVDT) type, however, other known units may be used. In the LVDT type of electromechanical transducer the electrical output is proportional to the displacement of a separate movable core, and the rods 50a and 50b are extensions of the core. It uses three coils equally spaced on a cylindrical coil form with the movable magnetic core positioned axially inside the core assembly that provides a path for magnetic flex linking the coils. When the center coil is energized with alternating current, voltages are induced in the two outer coils. When the movable core is centered the output is zero, but a differential voltage output that varies linearly is produced as the core changes position. The voltage linearly increases in the coil toward which the core moves, and linearly decreases in the coil from which the core is moving away. A handle 58 is mounted to an extension 60 of part 16 of the head 12. The handle is concentric with the axis of electromechanical probe 48b and is mounted with ball bearings 62 to provide a swivel effect. Line 64a contains wiring servicing electromechanical probe 48a, and line 64b contains wiring servicing electromechanical probe 48b. A lever arm 66 is joined to part 14 to permit one holding the handle to provide pressure to rotate the head open to place the hand held probe unit over a tubing to be measured.

Figure 1:
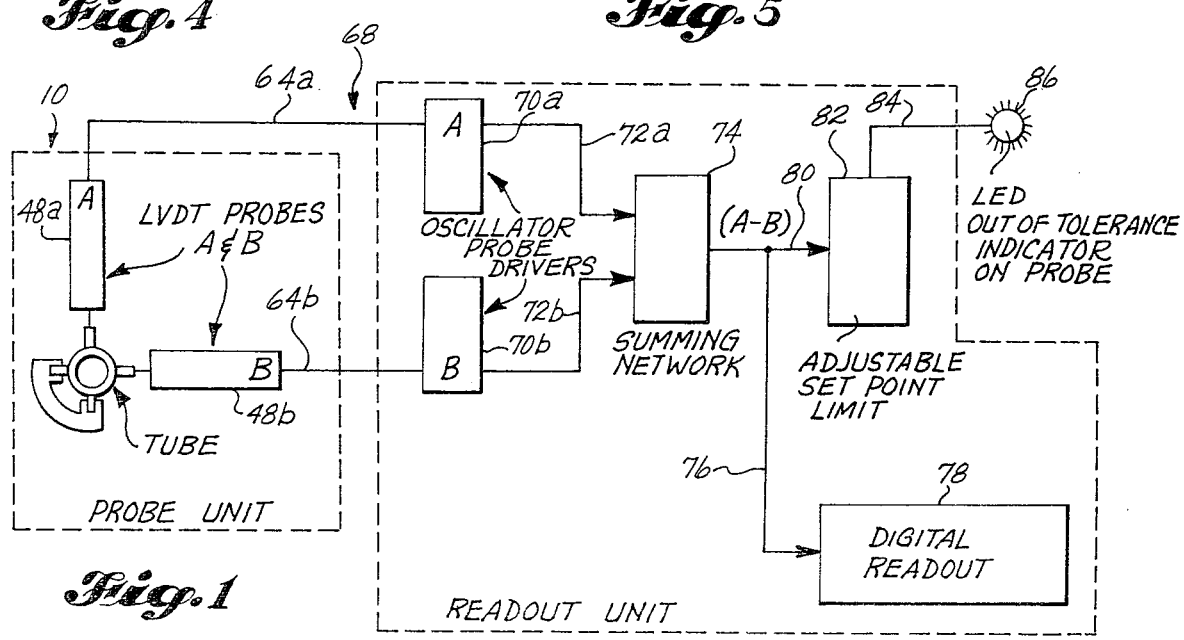
FIG. 1 shows a schematic of the measuring instrument of this invention.

The hand held probe unit 10 is part of an ovality measuring instrument 68, a schematic of which is shown in FIG. 1. In that Figure signals from the respective electromechanical probes 48a and 48b are sent through respective lines 64a and 64b through oscillator probe drivers 70a and 70b, through wires 72a and 72b, and into summing networks 74 where the difference between the two signals is generated. The difference signal is directed through line 76 and into display unit 78 where it is displayed in the form of a continuous digital readout. The difference signal is also directed through line 80 into an adjustable set point limiting unit 82; which is set at the ovality tolerance limit for a tubing to send a signal through line 84 to an indicator light 86 fastened with bracket 88 to the handle 58. This signal is sent to the indicator light whenever the tolerance limit is exceeded.

This light indicator is of the Light Emitting Diode type, however, other known types of indicators may be used.

Figures 4, 5:
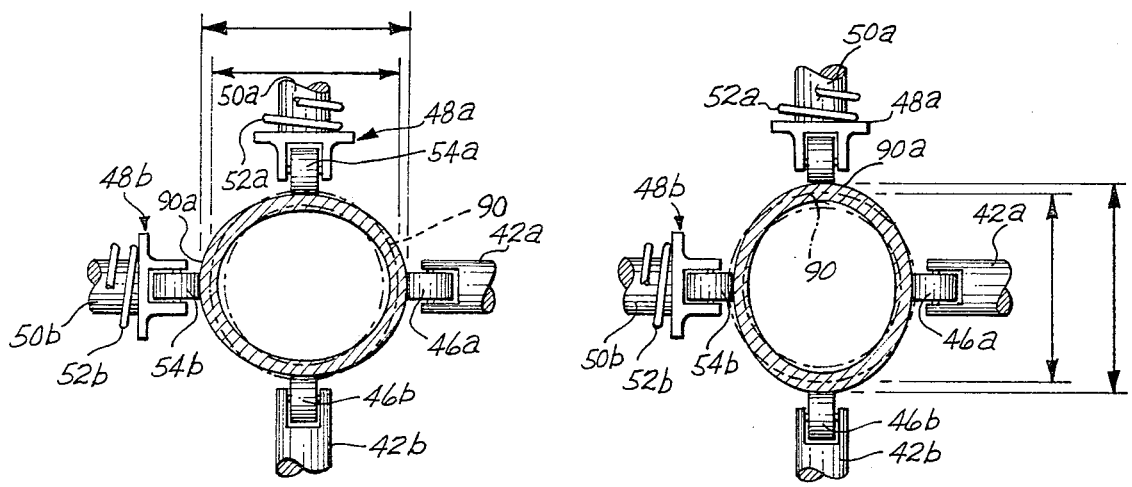
FIG. 4 shows an enlarged view of a fragmented portion of the probe unit of FIG. 3 measuring an oval tube having a major diameter in the horizontal direction.
FIG. 5 shows an enlarged view of a fragmented portion of the probe unit of FIG. 3 measuring an oval tube having a major diameter in the vertical direction.

In FIGS. 4 and 5 the anvils 42a and 42b in conjunction with the electromechanical probe 48a and 48b are shown holding a calibration tube. The tube 90 as shown in dotted lines is a round calibration tube. The tube 90a shown in solid lines is an oval calibration tube. In FIG. 4 the oval calibration tube 90a has the major axis in the horizontal direction, and in FIG. 5 the oval tube is shown with the major axis in the vertical direction.

In operation the ovality measuring probe 68 is calibrated by using the perfectly round calibration tube 90 positioned to be contacted by the rollers of the anvils and of the electromechanical probes of the hand held probe unit 10. These anvils and electromechanical probes are adjusted with the head closed, the tube located axially in the head, and the movable magnetic cores of the electromechanical probes each centered; so that the induced voltages are at zero at which position the springs 52a and 52b are partially compressed. Next the round tube is removed and a calibrated oval tube 90a placed in the hand held probe. This tube is selected to have an ovality that is at the limit of tolerance for a hydraulic tube of that size and this is set on the adjustable set point limiting unit 82; so that the indicator light will be energized when that limit of tolerance is exceeded. The calibrated oval tubing is first checked with the major diameter horizontal and next with the major diameter vertical.

In the operation of the unit to check the ovality of a bent tube the handle 58 is grasped and the lever 66 depressed to rotate the head open, the hand held probe unit 10 placed on the tubing and the unit moved along the bent portion of the tubing to determine the ovality. The unit is held with the handle axis approximately 90 degrees to a plane passing through the tube bend; which will keep the probes simultaneously measuring the major and the minor axis. The rollers are directed to provide ready contacting movement as the hand held probe unit moves along the tube with these rollers and the swivel features on the handle maintaining the measurement plane, of the electromechanical probes and the anvils, perpendicular to the tube axis. As the hand held probe unit is moved along the tube the display unit 78 continuously gives a digital readout, and should the ovality exceed the pre-determined tolerance limit the indicator light comes on to readily indicate that fact.

Figure 6:
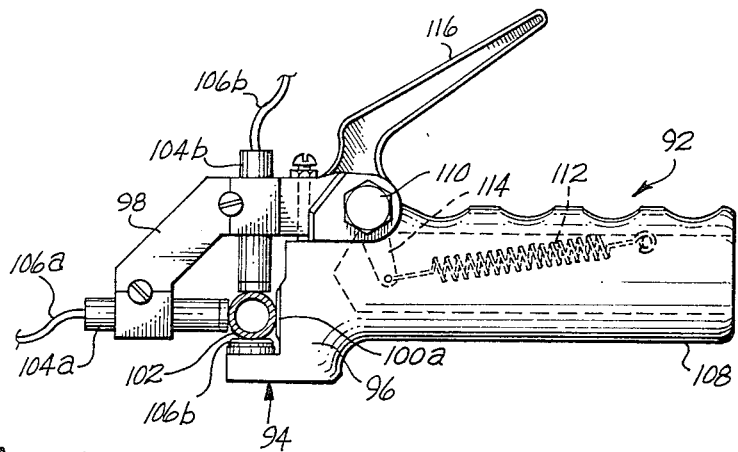
FIG. 6 shows a side elevational view of a different embodiment of the probe unit of this invention.

FIG. 6 shows a different embodiment of this invention with hand held probe 92 having a head 94 made up in two parts 96 and 98. A pair of anvils 100a and 100b are rigidly fastened to part 96 of the head at an angle of 90 degrees from each other. These anvils are located to make contact at 90 degrees around the perimeter of a tube 102 to be measured: A pair of electromechanical probes 104a and 104b are located to extend radially in the same radial plane as the anvils and at diametrically located positions with respect to the anvils. Lines 106a and 106b servicing the electromechanical probes lead to oscillator probe drives 70a and 70b. A handle 108 is integral with head part 96 and preferabley is located to be parallel to or on a line extending along the axis between electromechanical probe 104a and anvil 100a. The two parts of the head are pivotably joined with bolt 110. A spring 112 extends from the handle to a lever arm 114 joined to part 98 to resiliently hold the two parts of the head together. A second lever arm 116, also attached to part 98 of the head, is located to be easily actuated by one holding the handle to rotate the parts and permit placing the hand held probe unit over a tube to be measured.

We claim:

1. An apparatus for determining ovality of a bent tube with the apparatus comprising: head means for permitting said head to be rotated open and closed to permit placement of said head around tubing to be measured; first means disposed in said head for electromechanically diametrically measuring across a major diameter of the tubing; second means disposed in said head located at an angle of 90 degrees from said first measuring means and along the same radial plane, for electromechanically diametrically measuring across the minor diameter of the tubing; and means responsive to said first and second measuring means for electronically summing the measurements to determine and to display the ovality of the tubing.

2. An apparatus for determining ovality as in claim 1 further comprising means for indicating when the ovality is out of a predetermined tolerence.

3. An apparatus as in claim 1 further comprising means for maintaining a measurement plane of the two measuring means to permit accurate measurement along the distance of the bent portion of the tubing.

4. A device for determining ovality of a bent tube with the device comprising: a handle, a head attached to the handle, an anvil and an electromechanical displacement probe diametrically disposed in said head to extend radially inward toward each other from the head to measure across a major diameter of a bent tube, a second anvil and electromechanical displacement probe diametrically disposed in said head to extend inward toward each other on the same radial plane and at 90 degrees from the first anvil and probe to measure across the minor diameter of the bent tube, means for pivotally opening the head to permit placement around a tube and for resiliently counterrotating to close the head and hold the tube between the anvils and the probes, means responsive to the first and second probes for summing the measurements across the two diameters and for displaying same to show the ovality.

5. A device as in claim 4 further comprising means for indicating when the ovality is out of a predetermined tolerance.

6. A device as in claim 4 further comprising roller means at the tube contacting ends of the anvils and the probe.

7. A device as in claim 6 further comprising means for providing self aligning as the device is moved along the bent portion of the tube.

8. A device as in claim 5 further comprising roller means at the tube contacting ends of the anvils and the probes.

9. A device as in claim 8 further comprising means for providing self aligning as the device is moved along the bent portion of the tube.

10. A device for determining ovality of a bent tube with the device comprising: a head made up of two parts pivotally joined together and having a centrally located opening, an anvil disposed in said head and extending radially inward into the opening in the head, and electromechanical probe disposed in said head and extending inward diametrically with respect to the anvil to measure across a major diameter of a bent tube, a second anvil disposed in said head and extending radially inward into the opening along the same radial plane as and at 90 degrees from the first anvil, a second electromechanical probe disposed in said head and extending radially inward diametrically with respect to the second anvil to measure across the minor diameter of the bent tube, a handle to extend outward from one of the parts of the head, a resilient member to urge the head parts together while permitting opening of the head to place it over a bent tube to be measured, a network for summing the measurement output from the two probes, and a display of the results of summing to determine ovality of the tubing being evaluated.

11. A device as in claim 10 wherein the anvils and the probes are radially adjustable to permit calibrating to different diameter tubing.

12. A device as in claim 10 further comprising rollers located on the ends of the anvils and on the ends of the probes that contact the tubing.

13. A device as in claim 10 further comprising means for indicating when the ovality is out of a predetermined tolerance.

14. A device as in claim 10 further comprising means for swivelling the handle as the measuring device moves along the bent tube.

15. A method for measuring the ovality of a bent tube, with the steps comprising: placing a hand held probe over bent tubing to be measured by actuating a lever arm which rotates open a resiliently held closed head; releasing the lever arm for closing the head around the tubing; contacting the tubing with an inwardly and radially directed anvil and electromechanical probe mounted in the head to be diametrically located with respect to each other, and a second similarly mounted anvil and electromechanical probe at 90 degrees from the first anvil and probe; holding the hand held probe for measuring across the major diameter and simultaneously across the minor diameter of the tubing by orienting the electromechanical probes; summing the two diameters; and determining the ovality of the tubing by reading a continuous display of the results of the summing while moving the hand held probe along the bent portion of the tubing.

16. A method of measuring ovality of tubing as in claim 15, with steps further comprising instantaneously determining if any part of the tubing is out of ovality tolerance by observing an out of tolerance indicator which is displayed when the results of summing the electromechanical probes exceeds the ovality tolerance for the tubing.

17. A method of measuring ovality of tubing as in claim 15, with further steps comprising calibrating the hand held probe unit by adjusting the anvils and the electromechanics probes for contacting axially located round calibration tubing, removing the round tubing and replacing with oval calibration tubing sizing to be just at the limit of ovality tolerance for that size tubing, and adjusting the out of tolerance indicator to display when the tolerance limit is exceeded.

* * * * *